US011895366B1

(12) United States Patent
Khalil et al.

(10) Patent No.: US 11,895,366 B1
(45) Date of Patent: Feb. 6, 2024

(54) ENHANCED DYNAMIC AND CONTEXT-BASED PRESENTATION OF CONTENT USING STREAMING MEDIA APPLICATIONS

(71) Applicant: Amazon Technologies, Inc., Seattle, WA (US)

(72) Inventors: Mohamad Hassan Khalil, Seattle, WA (US); Ka Long Jesse Hon, Seattle, WA (US); Mervine Anand Govada, Fairfax, VA (US); Hanwei Zhang, Bellevue, WA (US); Sindhu Mukunda, Sunnyvale, CA (US); Ashish Bhandari, Redmond, WA (US); Michael McMurray, Las Vegas, NV (US); Aleksandr Kulikov, Seattle, WA (US); Edgar Elsdon DSouza, Brandywine, MD (US); Nam Quach, Frederick, MD (US); Nathan B. Lee, Clifton, VA (US); Rehan Madhugiri, Herndon, VA (US); Charlotte Baxter Maines, Seattle, WA (US); Guthrie Chipman Collin, New York, NY (US); Ala Kallel, Atherton, CA (US); Aniket Bhatt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/706,295

(22) Filed: Mar. 28, 2022

(51) Int. Cl.
*H04N 21/458* (2011.01)
*H04N 21/482* (2011.01)
*H04N 21/81* (2011.01)
*H04N 21/442* (2011.01)

(52) U.S. Cl.
CPC ..... *H04N 21/458* (2013.01); *H04N 21/44204* (2013.01); *H04N 21/4828* (2013.01); *H04N 21/812* (2013.01)

(58) Field of Classification Search
None
See application file for complete search history.

(56) References Cited

U.S. PATENT DOCUMENTS

2017/0223419 A1* 8/2017 Nassie .............. H04N 21/6175
2021/0144429 A1* 5/2021 Liu ................. H04N 21/47202
2021/0233147 A1* 7/2021 Berl ...................... G06N 20/00

* cited by examiner

Primary Examiner — Hsiungfei Peng
(74) Attorney, Agent, or Firm — Eversheds Sutherland (US) LLP

(57) ABSTRACT

Devices, systems, and methods are provided for dynamic and context-based presentation of content using streaming media applications. A method may include receiving, by a first device, a user request to search for media titles based on user context data received by a first streaming media application; identifying, from a catalog of media titles and streaming media applications, the media titles based on the user context data; identifying an advertisement campaign associated with a second streaming media application; selecting, based on the advertisement campaign and the user context data, a first media title; selecting, based on the user context data, a second media title; generating first user interface data indicative of the first media title and second user interface data indicative of the second media title; and causing presentation of the first user interface data and the second user interface data using a user interface of the first streaming media application.

20 Claims, 5 Drawing Sheets

ENHANCED DYNAMIC AND CONTEXT-BASED PRESENTATION OF CONTENT USING STREAMING MEDIA APPLICATIONS

BACKGROUND

Some streaming media applications allow users to search for content. The search results may be limited, however, to content provided by the streaming media application with which a user performs the search, and to advertisement campaigns that specify content to present, the time at which to present the content, and the location of a user interface with which to present the content.

Figure 1:
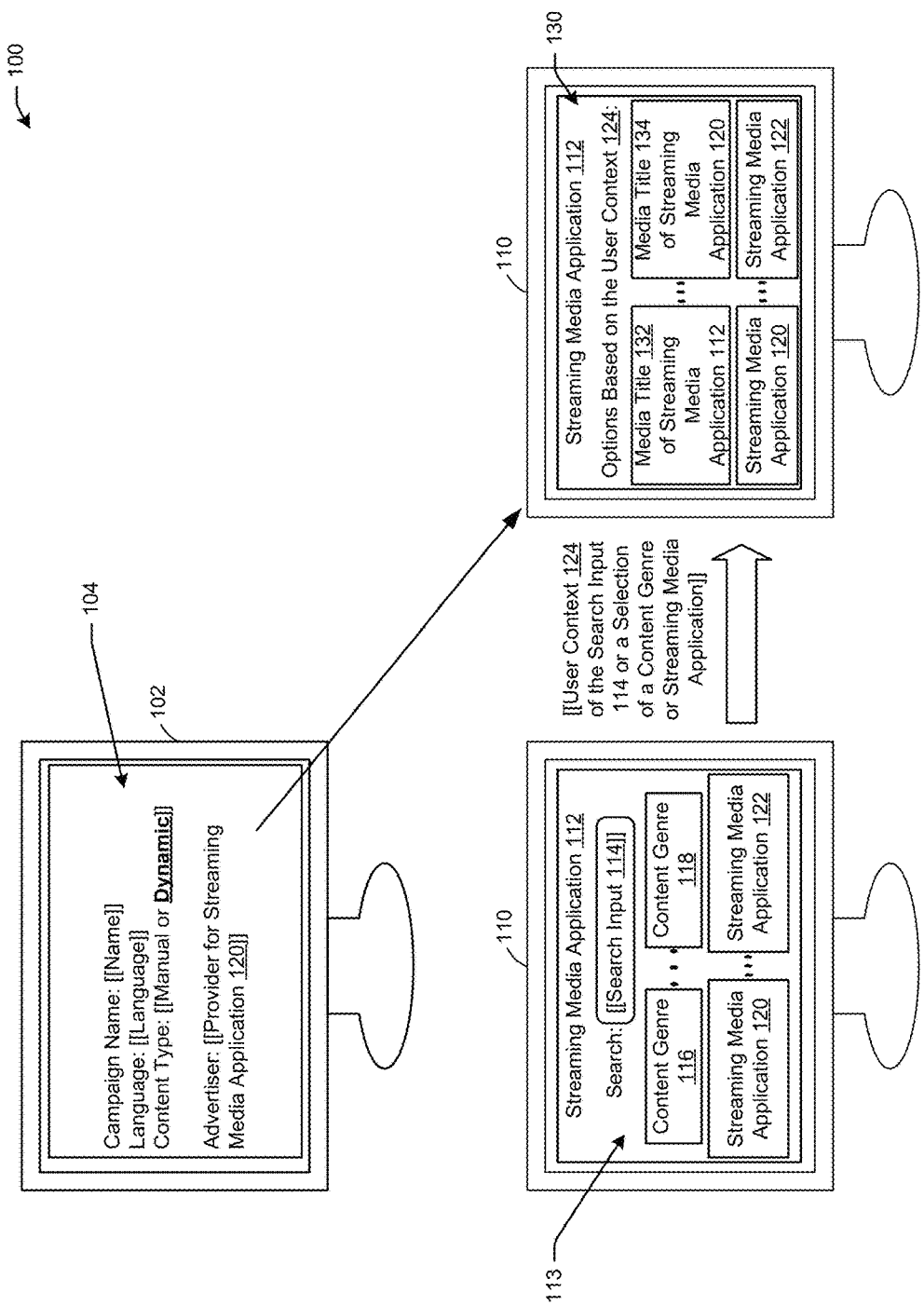
FIG. 1 shows an example system for dynamic and context-based presentation of content using a streaming media application, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for dynamic and context-based presentation of content using streaming media applications.

Over-the-top (OTT) media refers to streaming media delivered directly to viewers, in contrast with pre-planned content based on broadcast schedules dependent on content providers. For example, OTT content may be delivered over the Internet using streaming video applications and devices. OTT media services (e.g., streaming media applications) may deliver content using OTT techniques.

Streaming video and other streaming media applications may allow users to search for content. For example, a user may input a search string of "comedy" or select a comedy genre option to filter available comedy titles for presentation. However, generating the recommended content options in response to the search may be different than the manner in which a website may generate search results. For example, a website may receive a user input of "headphones," and may search an available product catalog for headphones to present as search results, along with existing advertisement campaigns for headphones and/or headphone sellers. Some streaming video and other streaming media applications may allow users to select and use multiple different services (e.g., multiple different streaming applications), each with a set of available titles, and a list of titles that a user has watched. Therefore, generating a catalog of available titles from which to search and select in such a streaming media application may require access to and aggregation of multiple catalogs of titles for each of the different services to provide an available catalog from which to search and recommend content.

In addition, some streaming video and other streaming media applications may allow an advertiser to schedule an advertisement for presentation using the streaming video and other streaming media applications. For example, a user may select an advertisement by selecting an identifier of the advertisement (e.g., a numerical identifier), and scheduling the identified advertisement for presentation (e.g., an advertisement for a video or audio title).

In some existing systems for streaming media applications, when an advertiser wants to promote their service/application, the advertiser may need to indicate which content (e.g., a particular media title, such as a movie or television show) within the service/application to which to assign the placement. Therefore, for context-based placements, the advertiser may need to schedule multiple creatives for each placement (e.g., selecting a comedy movie for a row of comedy movies, an action movie for a row of action movies, etc.).

There is therefore a need for dynamic advertisement scheduling for streaming video and other streaming media applications without requiring an advertiser to select an advertisement or advertisement schedule, and without limiting the selection of an advertisement to a specific existing campaign.

In one or more embodiments, an advertiser (e.g., content provider) using a streaming video and other streaming media applications (e.g., OTT media applications) may request the streaming video and other streaming media applications to select an advertisement (e.g., an advertisement for a video or audio title) to present, when, and where (e.g., using the streaming media application) without the advertiser selecting the actual advertisement, time, location of presentation, or user to whom to present the content (e.g., a dynamic advertisement request for a "skeleton" or "shell" advertisement). The advertiser may request presentation of an advertisement (e.g., at some unspecified time), and a system of the streaming media application may select an advertisement on behalf of the advertiser based on context of a user of the streaming media application. For example, context may be a search input (e.g., a genre, an actor, a word or string of words, etc.) or selection of such an input (e.g., a user clicking or providing a voice input to search or select a title, actor, keyword, application/service, etc.), a date, time of year, occasion (e.g., a holiday such as Christmas, Halloween, etc.), customer interest (e.g., popular titles, trending titles, next up for the user, etc.), and based on the user input, the system may identify a relevant title from a catalog of media titles that includes titles from multiple different services/applications available to a user of the streaming media application.

In one or more embodiments, the system may select the title to present using the streaming media application, when (e.g., in response to a user input rather than a pre-scheduled presentation), and where (e.g., the first title shown using the streaming media application, the second, the third, etc.). In this manner, by selecting from the aggregated catalog, the system may not need to select a title to advertise from an existing advertisement campaign, but instead may select any relevant title to present using the streaming media application as an option for a user. The system may use both the user context and advertisement requests to select the titles and/or applications/services to advertise. For example, when the system identifies one or more existing campaigns for applications/services that provide content matching the user context, the system may select content from the advertiser (e.g., an application/service) that generated the campaign. However, because the campaign may not specify the specific content to advertise (e.g., the content may be any title available using the application/service, or the application/service itself), or because the campaign may specify titles to advertise, but not which user context for which to present the titles (e.g., the campaign may not specify that a title be presented to a particular user or for a user context indicating a search for a particular genre), the system's selection may be more dynamic than some existing systems.

In one or more embodiments, the system may allow an advertiser to specify the provider (e.g., without having to specify the media title provided by the provider), and may rely on logic within an advertisement serving flow to select content for presentation depending on the user and the context of the placement (e.g., a genre, a search for an actor or director, etc.).

In one or more embodiments, the aggregated catalog may include video titles for selection, from multiple OTT streaming media applications, along with relevant data, such as the genre of the titles (e.g., action, drama, horror, etc.), actors/actresses appearing in the titles, directors, length, popularity, rating (e.g., G, PG, PG-13, R, etc.), release data, and the like. Other relevant information available to the system may include popular or newly released titles. For example, when a new season of a popular program has been released recently on a streaming media application/service, such information may be made available to the system, and the system may consider such information when selecting which titles and/or applications/services to advertise in response to received user context. Other relevant information may include a date (e.g., time of year), for example, proximity to a holiday when movies of a certain genre may be popular. The relevant information may be used to match user search inputs and select which titles to advertise as selectable titles presented using the streaming media application. The system also may have access to advertisement information for the titles and for advertisement requests. For example, the system may have data indicating click-through rates of titles, advertisement bids from advertisers, and the like. In this manner, when the system is evaluating which titles to select for presentation based on received user context, the system may consider which titles are most likely to be selected (e.g., based on click-through rate), regardless of the advertisement bid amount received from an advertiser of the title, and regardless of whether the user has a subscription to the application/service that provides the title. The determination of which title a user is most likely to select may be based on data from multiple users and/or data from a particular user (e.g., which titles a group of users have or a specific user has selected in the past). For example, a user may provide a user context input of "drama," and there may be multiple existing advertisement campaigns for different streaming applications/services that offer titles of the drama genre. Accordingly, the system may select from among the available campaigns titles and/or applications/services that offer titles of the drama genre, and may make such selections based on criteria such as click-through rate, date/time of year, newest title, or some other criteria.

In one or more embodiments, the advertised title selected for presentation may be from an entitled service/application or a non-entitled service/application. An entitled service refers to a service/application to which a user has a subscription (e.g., can access and watch video titles), whereas a non-entitled service/application refers to a service/application to which a user does not have a subscription and cannot access or watch video titles. In some examples, a non-entitled service/application may refer to when a user does not have an entitled service/application for particular content (e.g., the media title is only available to the user via a service/application to which the user does not have a subscription). Some existing media applications may not select for advertisement titles that are from a non-entitled service. For example, if a user of the streaming media application does not have a subscription to HBO, some systems of a streaming media application may not present Game of Thrones as a title for a user. However, the enhancements presented herein allow for the system to select Game of Thrones or other non-entitled titles for presented advertised titles to a user because the system may have access to catalogs of both entitled and non-entitled services/applications, including lists of the titles that a user has watched using entitled and non-entitled services/applications. When a user selects a presented title of a non-entitled service/application, the user may need to create an account or subscription to the service/application to watch the selected title, for example.

In one or more embodiments, the system for the streaming media application may include a query service that acts as a search engine. Based on a user context (e.g., user input), the query service may call for a row of media titles relevant to the user context. For example, when the user context is a user search query for an action title, the query service may call for a row of action titles to be presented to the user using the streaming media application. The query service's call may be sent to a request service that may receive the call, including the user context, the user who provided the user context, and the application with which the user provided the user context. Another service may select the advertised title from the relevant titles based on the user context. For example, the service may select a title to advertise based on an advertisement budget, frequency requirement, or the like. In some embodiments, an advertiser may select titles to promote or not promote, and in some embodiments, the system may select titles to advertise without the advertiser indicating which titles to promote.

In one or more embodiments, the titles presented as user-selectable options using the streaming media application may be considered advertisements (e.g., rather than simply titles that match a user input, such as a search input). For example, when a user search input as user context is "comedy," the comedy titles selected for presentation may be considered advertisements, allowing the system of the streaming media application to monetize the selection and presentation of the titles. The system may have access to advertisement requests from advertisers, so when the system selects a title for presentation based on received user context, the system may determine whether a selected title is provided by the advertiser (e.g., an OTT application). In this manner, when the title is provided by a particular application, and that application has requested presentation of an advertisement for the application's content, the system may attribute the selected title to the advertisement request received by the application, thereby fulfilling advertisement requests that do not specify the specific title to be advertised at any particular time or location. Unlike a web search engine, for example, the system may have access to titles from multiple different applications/services, even non-entitled applications/services, and may present as advertisements specific titles from those applications/services whether or not there is an existing campaign for the specific title, and even when an existing campaign does not specify the titles to advertise. Any title and application/service may be considered an advertisement that may be presented based on received user context, even when an advertiser has not generated a campaign to advertise a particular title.

In one or more embodiments, a recommendation engine of the system for the streaming media application may select the titles to present to a user based on received user context and based on received advertisement requests that may not specify the titles to advertise (e.g., other than that the titles be provided by the requesting advertiser) and that may not specify the time or location of presentation of the titles as advertisements. In addition or alternative to the titles, the recommendation engine may select an application/service to advertise. In some embodiments, the advertiser may select the recommendation engine to use, such as the recommendation engine of the streaming media application used to present the advertisement, or a recommendation engine of a different streaming media application whose titles are accessible through the streaming media application used to present the advertisement. For example, when the advertiser is a streaming media application/service accessible through the streaming media application used to present the advertisement, the advertiser may select the recommendation engine from its own streaming media application/service to make the selection, in which case the selected advertisement for presentation may be limited to one or more catalogs of content available to the advertiser's streaming media application/service (e.g., which may include only titles accessible via that streaming media application/service rather than the aggregated catalog). Such an advertiser selection may allow advertisers to rely on user data available to their own streaming media application/service, and on different criteria with which to select advertisements for presentation based on the available user context. For example, using the same user context, different recommendation engines may select different titles and/or applications/services to advertise.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 shows an example system 100 for dynamic and context-based presentation of content using a streaming media application, in accordance with one or more example embodiments of the present disclosure.

Referring to FIG. 1, the system 100 may include a device 102 with which an advertiser may request an advertisement campaign 104. For example, an advertiser (e.g., a provider of a streaming media application or other content) may provide a name for the campaign, a language for the campaign, a content type (e.g., manual or dynamic—manual allowing the advertiser to specify which content, such as particular media titles, to advertise, and dynamic not requiring the advertiser to specify the content to advertise, nor the time or location of an advertisement for the campaign), and the advertiser.

Still referring to FIG. 1, when a device 110 presents a streaming media application 112 to a user, an interface 113 for the streaming media application 112 may include a search input 114 option for a user to search for content, content genre options (e.g., content genre 116 and content genre 118, such as comedy, drama, horror, action, etc.), and other streaming media applications (e.g., streaming media application 120 and streaming media application 122) that a user may select (e.g., open) from the streaming media application 112 to view content.

Still referring to FIG. 1, when a user provides user context 124 as an input to the interface 113 (e.g., the user context 124 may include a search input 114, such as a string of characters including one or more words, names, etc., or a selection of a content genre or streaming media application), the device 110 may present a user interface 130 that may include selectable options for a user based on the received user context 124, and/or based on the advertisement campaign 104. As shown, the selectable options may include media titles (e.g., media title 132 and media title 134, which may be available for presentation via the streaming media application 112 and/or from other streaming media applications selectable from the streaming media application 112) and/or streaming media applications (e.g., eligible and/or non-eligible streaming media applications, such as the streaming media application 120 and the streaming media application 122).

In one or more embodiments, the system 100 may select an advertisement on behalf of the advertiser of the advertisement campaign 104 based on the user context 124 of a user of the streaming media application 112. For example, the user context 124 may be the search input 114 (e.g., a genre, an actor, a word or string of words, etc.) or selection of such an input (e.g., a user clicking or providing a voice input to search or select a title, actor, keyword, application/service, etc.), and based on the user input, the system 100 may identify a relevant title from a catalog of media titles that includes titles from multiple different services/applications available to a user of the streaming media application 112. The system 100 may select the title to present using the streaming media application 112, when (e.g., in response to a user input rather than a pre-scheduled presentation), and where (e.g., the first title shown using the streaming media application, the second, the third, etc.). The system 100 may use both the user context and advertisement requests to select the titles and/or applications/services to advertise. For example, when the system 100 identifies one or more existing campaigns for applications/services that provide content matching the user context 124, the system 100 may select content from the advertiser (e.g., an application/service) that generated the campaign. However, because the campaign may not specify the specific content to advertise (e.g., the content may be any title available using the application/service, or the application/service itself), or because the campaign may specify titles to advertise, but not which user context for which to present the titles (e.g., the campaign may not specify that a title be presented to a particular user or for a user context indicating a search for a particular genre), the system's selection may be more dynamic than some existing systems.

In one or more embodiments, the system may have access to video titles for selection from multiple OTT streaming media applications, along with relevant data, such as the genre of the titles (e.g., action, drama, horror, etc.), actors/actresses appearing in the titles, directors, length, popularity, rating (e.g., G, PG, PG-13, R, etc.), release data, and the like. Other relevant information available to the system 100 may include popular or newly released titles. For example, when a new season of a popular program has been released recently on a streaming media application/service, such information may be made available to the system 100, and the system 100 may consider such information when selecting which titles and/or applications/services to advertise in response to the user context 124. Other relevant information may include a date (e.g., time of year), for example, proximity to a holiday when movies of a certain genre may be popular. The relevant information may be used to match user search inputs and select which titles to advertise as selectable titles presented using the streaming media application 112 (e.g., using the interface 130). The system 100 also may have access to advertisement information for the titles and for advertisement requests. For example, the system 100 may have data indicating click-through rates of titles, advertisement bids from advertisers, and the like. In this manner, when the system 100 is evaluating which titles to select for presentation based on the user context 124, the system 100 may consider which titles are most likely to be selected (e.g., based on click-through rate), regardless of the advertisement bid amount received from an advertiser of the title, and regardless of whether the user has a subscription to the application/service that provides the title. The determination of which title a user is most likely to select may be based on data from multiple users and/or data from a particular user (e.g., which titles a group of users have or a specific user has selected in the past). For example, a user may provide a user context input of "drama," and there may be multiple existing advertisement campaigns for different streaming applications/services that offer titles of the drama genre. Accordingly, the system 100 may select from among the available campaigns titles and/or applications/services that offer titles of the drama genre, and may make such selections based on criteria such as click-through rate, date/time of year, newest title, or some other criteria.

In one or more embodiments, the advertised title selected for presentation (e.g., via the interface 130) may be from an entitled service/application or a non-entitled service/application. An entitled service refers to a service/application to which a user has a subscription (e.g., can access and watch video titles), whereas a non-entitled service/application refers to a service/application to which a user does not have a subscription and cannot access or watch video titles. When a user selects a presented title of a non-entitled service/application, the user may need to create an account or subscription to the service/application to watch the selected title, for example.

In one or more embodiments, the titles presented as user-selectable options using the streaming media application 112 (e.g., the interface 130) may be considered advertisements (e.g., rather than simply titles that match a user input, such as a search input). For example, when the search input 114 as the user context 124 is "action," the action titles selected for presentation may be considered advertisements, allowing the system 100 to monetize the selection and presentation of the titles. The system 100 may have access to advertisement requests from advertisers, so when the system 100 selects a title for presentation based on received user context, the system 100 may determine whether a selected title is provided by the advertiser (e.g., an OTT application). In this manner, when the title is provided by a particular application, and that application has requested presentation of an advertisement for the application's content, the system 100 may attribute the selected title to the advertisement request received by the application, thereby fulfilling advertisement requests that do not specify the specific title to be advertised at any particular time or location. Unlike a web search engine, for example, the system 100 may have access to titles from multiple different applications/services, even non-entitled applications/services, and may present as advertisements specific titles from those applications/services whether or not there is an existing campaign for the specific title, and even when an existing campaign does not specify the titles to advertise. Any title and application/service may be considered an advertisement that may be presented based on received user context, even when an advertiser has not generated a campaign to advertise a particular title.

In one or more embodiments, the system 100 may select the titles to present to a user based on received user context and based on received advertisement requests that may not specify the titles to advertise (e.g., other than that the titles be provided by the requesting advertiser) and that may not specify the time or location of presentation of the titles as advertisements. In addition or alternative to the titles, the system 100 may select an application/service to advertise. In some embodiments, the advertiser may select a recommendation engine to use, such as the recommendation engine of the streaming media application 112, or a recommendation engine of a different streaming media application whose titles are accessible through the streaming media application 112 (e.g., the streaming media application 120 or the streaming media application 122). For example, when the advertiser is a streaming media application/service accessible through the streaming media application 112, the advertiser may select the recommendation engine from its own streaming media application/service to make the selection, in which case the selected advertisement for presentation may be limited to one or more catalogs of content available to the advertiser's streaming media application/service. Such an advertiser selection may allow advertisers to rely on user data available to their own streaming media application/service, and on different criteria with which to select advertisements for presentation based on the available user context. For example, using the same user context, different recommendation engines may select different titles and/or applications/services to advertise.

In one or more embodiments, the locations at which the tiles (e.g., for the media title 132, the media title 134, the streaming media application 120, the streaming media application 122, etc.) are presented using the interface 130 may be selected by the system 100. As explained further below with respect to FIG. 2, a row of media titles and/or services/applications to present may have multiple slots (e.g., the media title 132 as shown may represent one slot in a row, and the media title 134 may represent another slot in the row). Based on the user context 124, the system may identify multiple rows available for presentation via the interface 130, and may select which rows to present and where (e.g., which is the top row, etc.) based on a variety of factors, such as existing advertisement campaigns, whether the row has non-entitled services/applications, and the like.

In one or more embodiments, the streaming media application 112 may be an application through which a user may select other streaming media applications, and with which a user may play media titles. The interface 113 may be a user platform that aggregates content from multiple user-selectable applications, and a user may select the content from the interface 113. Based on which application provides the content (e.g., a media title), upon user selection, the application that provides the selected content from the interface 113 may be executed to present the selected content. In this manner, the streaming media application 112 may represent a platform with which multiple streaming media applications and their media titles may be available for user selection. When the streaming media application 112 is able to present user-selected media titles, then upon user selection of a media title presentable using the streaming media application 112 (e.g., the media title 132 as shown in FIG. 1), the streaming media application 112 may execute to present the selected media title without having to execute a separate streaming media application.

In one or more embodiments, the device 102 and/or the device 110 may include and/or be facilitated by a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, or the like.

Figure 2:
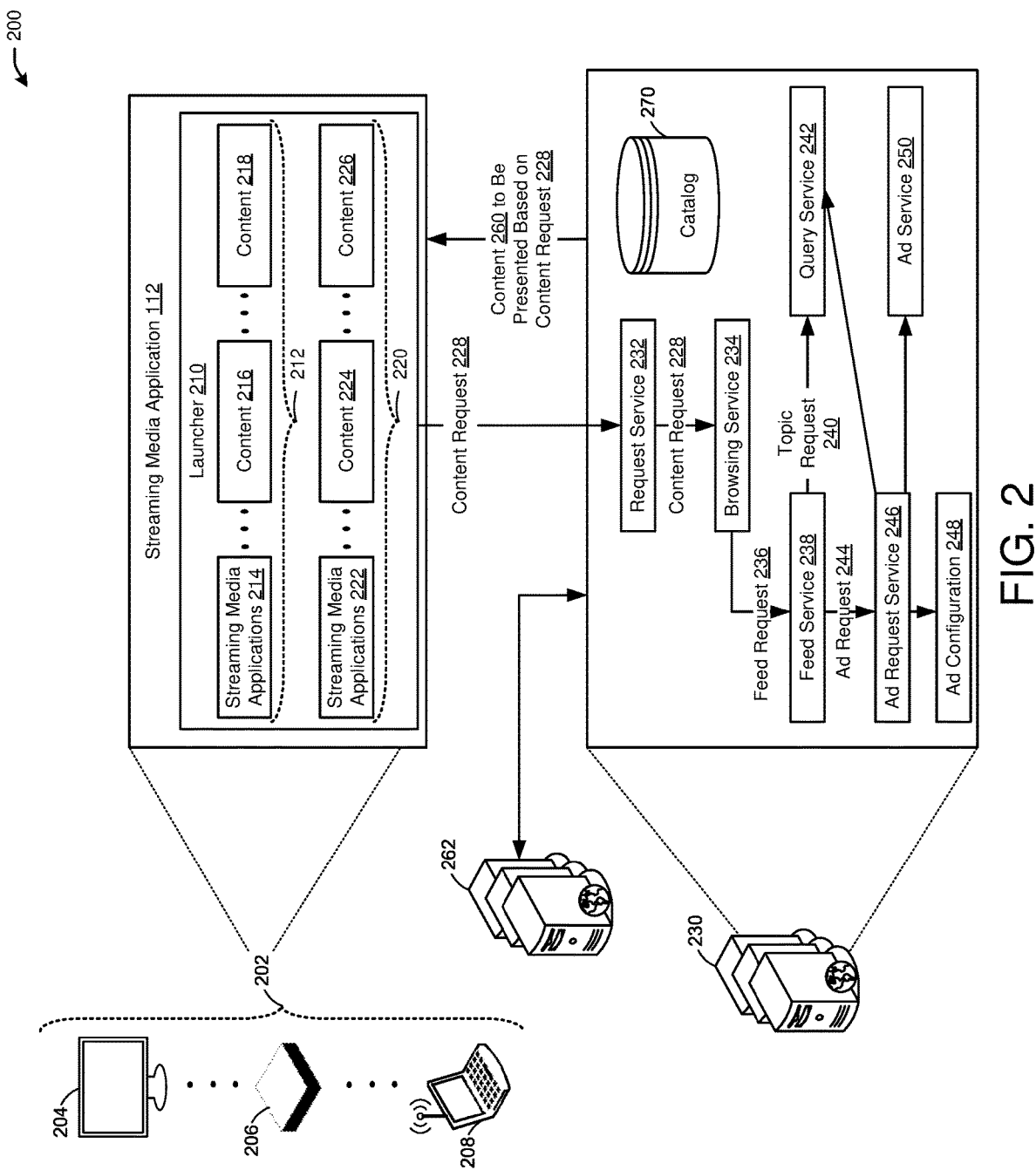
FIG. 2 shows an example system for dynamic and context-based presentation of content using a streaming media application, in accordance with one or more example embodiments of the present disclosure.

FIG. 2 shows an example system 200 for dynamic and context-based presentation of content using a streaming media application, in accordance with one or more example embodiments of the present disclosure.

Referring to FIG. 2, the system 200 (e.g., representing additional details of the system 100 of FIG. 1) may include streaming media devices 202 (e.g., device 204, device 206, device 208, similar to the device 102 and the device 110 of FIG. 1). The streaming media devices 202 may execute the streaming media application 112 of FIG. 1, which may include a launcher 210 having rows of content in multiple slots for presentation using the streaming media devices 202. For example, a row 212 may include tiles such as for streaming media application 214, content 216 (e.g., media titles or other related merchandise), and content 218 (e.g., media titles or other related merchandise). A row 220 may include tiles such as for streaming media application 222, content 224 (e.g., media titles or other related merchandise), and content 226 (e.g., media titles or other related merchandise). The launcher 210 may, in response to received user context (e.g., the user context 124 of FIG. 1), generate and send a content request 228 (e.g., identifying the user of the streaming media application 112, the user context, and the streaming media application 112).

Still referring to FIG. 2, a remote system 230 (e.g., a cloud-based system having one or more servers) may receive the content request 228 at a request service 232, which may provide the content request 228 to a browsing service 234. The browsing service 234 may implement logic to build content for the streaming media application 112 to present, and may generate and send a feed request 236 to a feed service 238. The feed service 238 may receive a content feed, and convert the feed for the browsing service 234. In particular, the feed service 238 may generate and send a topic request 240 to a query service 242. The topic request 240 may provide the user context as a call to the query service 242 to populate the tiles of a row (e.g., the row 212 and the row 220). The query service 242 may respond with a list of highest ranking media titles and/or applications/services for the tiles based on the user context. The feed service 238 may generate and send an advertisement request 244 to an advertisement request service 246 to insert advertisements for the rows. The advertisement request service 246 may evaluate an advertisement configuration 248 to identify advertisement slots enabled for the rows, and the advertisement request service 246 may call an advertisement service 250 for the placement of advertisements and slots for the rows. The advertisement service 250 may respond with the advertisements. When an advertisement is dynamic, the advertisement request service 246 may query the query service 242 to return data such as whether the advertisement is for an entitled or non-entitled service/application, and for the provider (e.g., advertiser) of the advertisement. The advertisement request service 246 may insert an advertisement into a corresponding slot of the list of tiles, may remove any duplicate tiles, and return the tiles to the feed service 238, which may return the tiles to the browsing service 234, which may return the tiles to the request service 232, which may provide the tiles to the launcher 210 as content 260 to be rendered (e.g., the row 212 and the row 220, such as using the interface 130 of FIG. 1) based on the content request 228.

Still referring to FIG. 2, a third party recommendation service 262 (e.g., external to the remote system 230) may provide advertisement recommendations for the remote system 230 to consider when selecting the tiles to include in the row 212 and the row 220. For example, the third party recommendation service 262 may recommend certain titles from certain applications be advertised, such as popular titles, new titles, and the like. The advertisement service 250 may provide advertisements in response to the call from the advertisement request service 246 with advertisements selected based on a variety of criteria, including the recommendations of the third party recommendation service 262.

In one or more embodiments, an advertiser (e.g., for the advertisement campaign 104 of FIG. 1) using the streaming media application 112 may request the streaming media application 112 to select an advertisement (e.g., an advertisement for a video or audio title) to present, when, and where (e.g., using the streaming media application) without the advertiser selecting the actual advertisement, time, location of presentation, or user to whom to present the content (e.g., a dynamic advertisement request for a "skeleton" or "shell" advertisement). The advertiser may request presentation of an advertisement (e.g., at some unspecified time), and the system 200 may select an advertisement on behalf of the advertiser based on context of a user of the streaming media application 112. For example, context may be a search input (e.g., a genre, an actor, a word or string of words, etc.) or selection of such an input (e.g., a user clicking or providing a voice input to search or select a title, actor, keyword, application/service, etc.), a date, time of year, occasion (e.g., a holiday such as Christmas, Halloween, etc.), customer interest (e.g., popular titles, trending titles, next up for the user, etc.), and based on the user input, the system 200 may identify a relevant title from a catalog 270 of media titles that includes titles from multiple different services/applications available to a user of the streaming media application 112.

In one or more embodiments, the system 200 may select the title to present using the streaming media application 112, when (e.g., in response to a user input rather than a pre-scheduled presentation), and where (e.g., the first title shown using the streaming media application, the second, the third, etc.). The system 200 may use both the user context and advertisement requests to select the titles and/or applications/services to advertise. For example, when the system 200 identifies one or more existing campaigns for applications/services that provide content matching the user context (e.g., based on the advertisement service 250), the system 200 may select content from the advertiser (e.g., an application/service) that generated the campaign. However, because the campaign may not specify the specific content to advertise (e.g., the content may be any title available using the application/service, or the application/service itself), or because the campaign may specify titles to advertise, but not which user context for which to present the titles (e.g., the campaign may not specify that a title be presented to a particular user or for a user context indicating a search for a particular genre), the system's selection may be more dynamic than some existing systems.

In one or more embodiments, the system 200 may allow an advertiser to specify the provider (e.g., without having to specify the media title provided by the provider), and may rely on logic within an advertisement serving flow to select content for presentation depending on the user and the context of the placement (e.g., a genre, a search for an actor or director, etc.).

In one or more embodiments, the aggregated catalog 270 may include video titles for selection, from multiple OTT streaming media applications, along with relevant data, such as the genre of the titles (e.g., action, drama, horror, etc.), actors/actresses appearing in the titles, directors, length, popularity, rating (e.g., G, PG, PG-13, R, etc.), release data, and the like. Other relevant information available to the system 200 may include popular or newly released titles. For example, when a new season of a popular program has been released recently on a streaming media application/service, such information may be made available to the system 200, and the system 200 may consider such information when selecting which titles and/or applications/services to advertise in response to received user context. Other relevant information may include a date (e.g., time of year), for example, proximity to a holiday when movies of a certain genre may be popular. The relevant information may be used to match user search inputs and select which titles to advertise as selectable titles presented using the streaming media application. The system 200 also may have access to advertisement information for the titles and for advertisement requests. For example, the system 200 may have data indicating click-through rates of titles, advertisement bids from advertisers, and the like. In this manner, when the system 200 is evaluating which titles to select for presentation based on received user context, the system 200 may consider which titles are most likely to be selected (e.g., based on click-through rate), regardless of the advertisement bid amount received from an advertiser of the title, and regardless of whether the user has a subscription to the application/service that provides the title. The determination of which title a user is most likely to select may be based on data from multiple users and/or data from a particular user (e.g., which titles a group of users have or a specific user has selected in the past). For example, a user may provide a user context input of "horror," and there may be multiple existing advertisement campaigns for different streaming applications/services that offer titles of the horror genre. Accordingly, the system 200 may select from among the available campaigns titles and/or applications/services that offer titles of the horror genre, and may make such selections based on criteria such as click-through rate, date/time of year, newest title, or some other criteria.

In one or more embodiments, based on a user context (e.g., user input), the feed service 238 may call the advertisement request service 246 for a row of media titles relevant to the user context. For example, when the user context is a user search query for an actor's name, the query service may call for a row of titles having the actor to be presented to the user using the streaming media application 112. The advertisement service 250 may select the advertised title from the relevant titles based on the user context. For example, the advertisement service 250 may select a title to advertise based on an advertisement budget, frequency requirement, or the like. In some embodiments, an advertiser may select titles to promote or not promote, and in some embodiments, the system 200 may select titles to advertise without the advertiser indicating which titles to promote.

Figure 3:
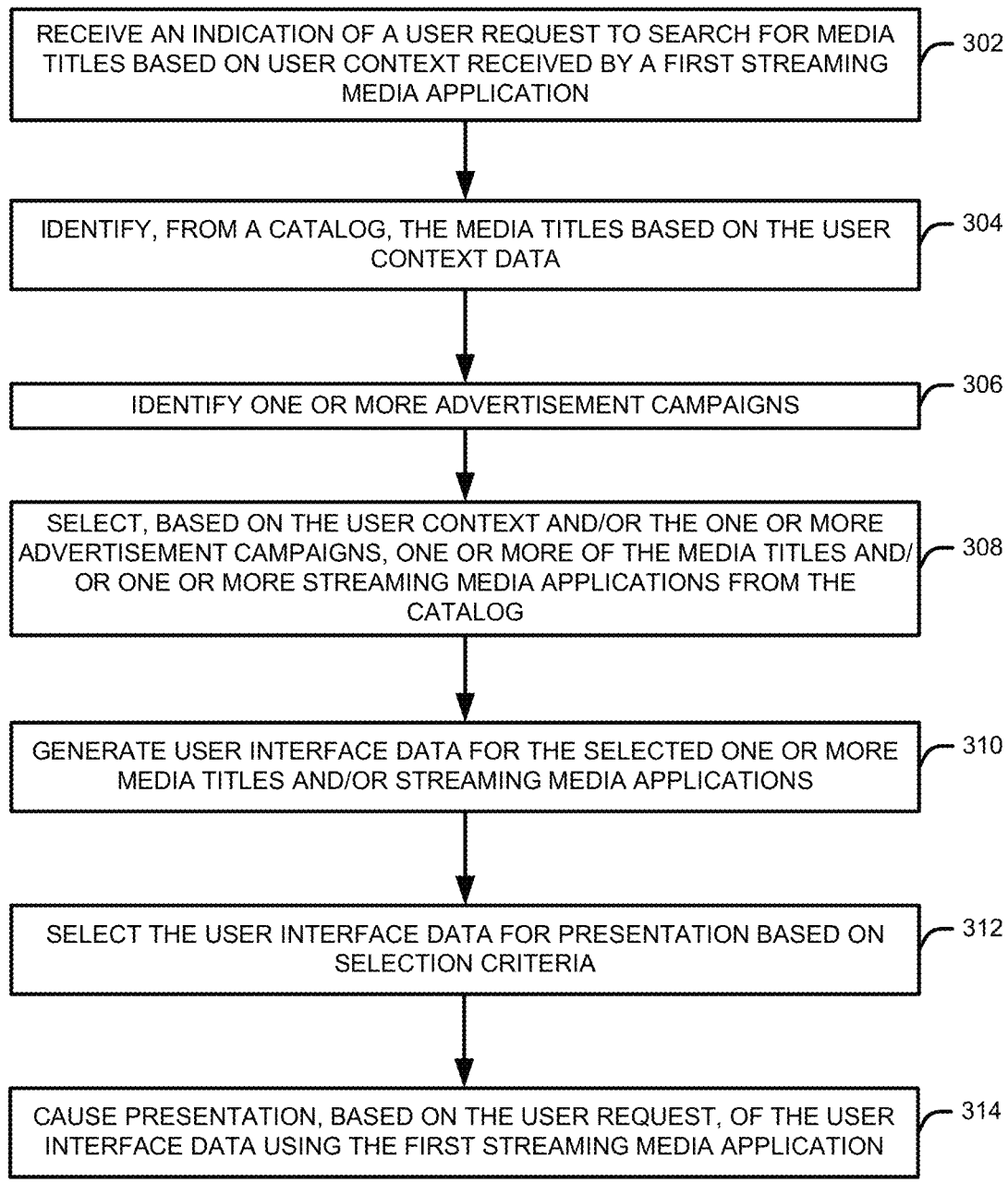
FIG. 3 illustrates a flow diagram for a process for dynamic and context-based presentation of content using a streaming media application, in accordance with one or more example embodiments of the present disclosure.

FIG. 3 illustrates a flow diagram for a process 300 for dynamic and context-based presentation of content using a streaming media application, in accordance with one or more example embodiments of the present disclosure.

At block 302, a device (or system, e.g., the remote system 230 of FIG. 2) may receive an indication of a user request (e.g., the content request 228 of FIG. 2 indicative of the user context 124 of FIG. 1) to search for streaming media titles based on user context received by a first streaming media application (e.g., the streaming media application 112 of FIGS. 1 and 2). The user request may have been a selection of a content genre, a search input, or the user context may include other context such as a date/occasion. In this manner, the indication of the user request does not require a user to actually request a search for certain content, but may be indicative of information relevant to a user's interaction with an interface (e.g., the interface 113 of FIG. 1), such as the date or time of day when the user is using the interface, a search string input via the interface, a selection of content or content genre, or the like.

At block 304, the device may identify, from a catalog (e.g., the catalog 270 of FIG. 2), the media titles based on the context data. The process by which the media titles are identified (e.g., by the advertisement service 250 of FIG. 2) is detailed above with respect to FIG. 2. The device may identify advertisements (e.g., media titles and/or services/applications providing media titles) that may be advertised as tiles (e.g., selectable images) in respective slots of rows having one or more tiles (e.g., the rows 212 and 220 of FIG. 2). The device may use the user context to search for relevant media titles and/or services/applications (e.g., having one or more words or names of a search input, having a matching genre based on a user input and/or a time of year, etc.).

At block 306, the device may identify one or more existing advertisement campaigns (e.g., the advertisement campaign 104 of FIG. 1). The device may prioritize certain advertisements for the slots, for example, based on existing advertisement campaigns, popular titles, what the particular user for whom the request was made has watched, advertisement success (e.g., click-through rate and/or other pass-through indicators), and the like.

At block 308, the device may select, based on the user context and, optionally, the one or more advertisement campaigns, one of ore of the matching media titles and/or matching applications/services (e.g., matching the user context) from the catalog for presentation using the slots in the rows. The selection may prioritize entitled or non-entitled content, and/or existing campaigns. The selection may avoid duplicate placement, and when a same title is available using multiple applications/services, the device may select the version of the title from an application/service that may be entitled, non-entitled, or that has an existing advertisement campaign. When selecting a media title or application/service that has an existing campaign, the device may attribute the selection to the campaign for the purposes of fulfilling advertisement requests and tracking advertisement usage and performance.

At block 310, the device may generate user interface data (e.g., first user interface data for a first tile, second user interface data for a second tile, third user interface data for a third tile, etc.) representing the presentation of media titles and/or applications/services (e.g., selectable images of media titles and/or applications/services) to be presented using the first streaming media application (e.g., using the interface 130 of FIG. 1).

At block 312, the device may select the user interface data for presentation (e.g., media tiles of the rows in FIGS. 1 and 2) based on selection criteria. The selection criteria may include received advertisement bids, click-through rate, date/time of year, newest title, and/or some other criteria, such as recommended content received from a third party (e.g., the third party recommendation service 262 of FIG. 2). In this manner, multiple media tiles may be available for the user presentation based on the user context, and to select which tiles and where to present them, the selection may be based on such criteria to provide content options to a user.

At block 314, the device may cause presentation, in response to the user request, of the generated user interface data using the first streaming media application. In particular, the device may provide the selected user interface data and the location of the data to present in respective rows and titles to the first streaming media application for presentation.

Figure 4:
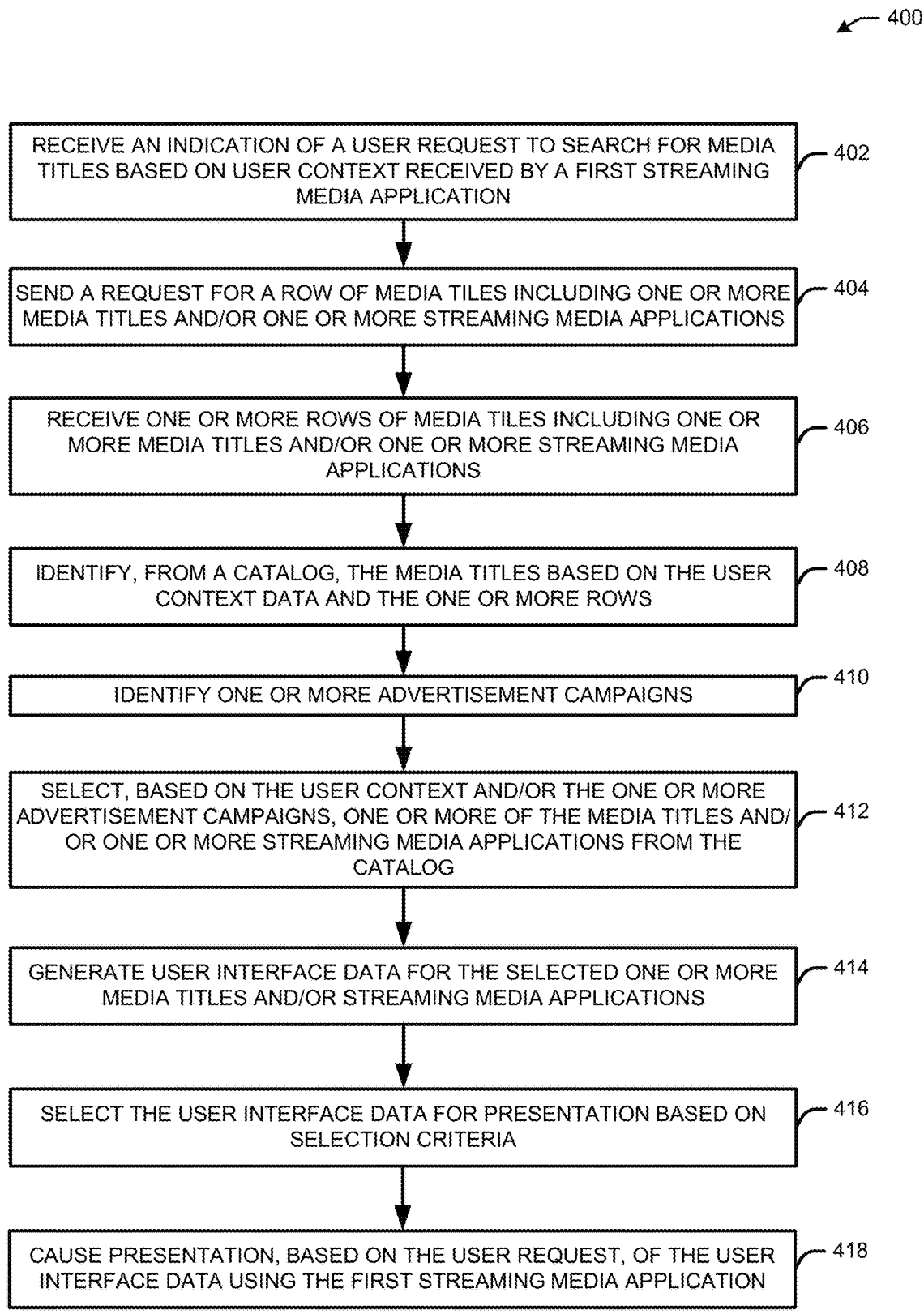
FIG. 4 illustrates a flow diagram for a process for dynamic and context-based presentation of content using a streaming media application, in accordance with one or more example embodiments of the present disclosure.

FIG. 4 illustrates a flow diagram for a process 400 for dynamic and context-based presentation of content using a streaming media application, in accordance with one or more example embodiments of the present disclosure.

At block 402, a device (or system, e.g., the remote system 230 of FIG. 2) may receive an indication of a user request (e.g., the content request 228 of FIG. 2 indicative of the user context 124 of FIG. 1) to search for streaming media titles based on user context received by a first streaming media application (e.g., the streaming media application 112 of FIGS. 1 and 2). The user request may have been a selection of a content genre, a search input, or the user context may include other context such as a date/occasion. In this manner, the indication of the user request does not require a user to actually request a search for certain content, but may be indicative of information relevant to a user's interaction with an interface (e.g., the interface 113 of FIG. 1), such as the date or time of day when the user is using the interface, a search string input via the interface, a selection of content or content genre, or the like.

At block 404, the device may generate and send a request (e.g., to the advertisement service 250 of FIG. 2) for a row of media tiles including one or more media titles and/or one or more streaming media services/applications.

At block 406, the device may receive (e.g., from the advertisement service 250) one or more rows of media tiles including one or more media titles and/or one or more streaming media services/applications.

At block 408, the device may identify (e.g., from the catalog 270 of FIG. 2) one or more existing advertisement campaigns (e.g., the advertisement campaign 104 of FIG. 1). The device may prioritize certain advertisements for the slots, for example, based on existing advertisement campaigns, popular titles, what the particular user for whom the request was made has watched, advertisement success (e.g., click-through rate and/or other pass-through indicators), and the like.

At block 410, the device may identify one or more existing advertisement campaigns (e.g., the advertisement campaign 104 of FIG. 1). The device may prioritize certain advertisements for the slots, for example, based on existing advertisement campaigns, popular titles, what the particular user for whom the request was made has watched, advertisement success (e.g., click-through rate and/or other pass-through indicators), and the like.

At block 412, the device may select, based on the user context and, optionally, the one or more advertisement campaigns, one of ore of the matching media titles and/or matching applications/services (e.g., matching the user context) from the catalog for presentation using the slots in the rows. The selection may prioritize entitled or non-entitled content, and/or existing campaigns. The selection may avoid duplicate placement, and when a same title is available using multiple applications/services, the device may select the version of the title from an application/service that may be entitled, non-entitled, or that has an existing advertisement campaign. When selecting a media title or application/service that has an existing campaign, the device may attribute the selection to the campaign for the purposes of fulfilling advertisement requests and tracking advertisement usage and performance.

At block 414, the device may generate user interface data (e.g., first user interface data for a first tile, second user interface data for a second tile, third user interface data for a third tile, etc.) representing the presentation of media titles and/or applications/services (e.g., selectable images of media titles and/or applications/services) to be presented using the first streaming media application (e.g., using the interface 130 of FIG. 1).

At block 416, the device may select the user interface data for presentation (e.g., media tiles of the rows in FIGS. 1 and 2) based on selection criteria. The selection criteria may include received advertisement bids, click-through rate, date/time of year, newest title, and/or some other criteria, such as recommended content received from a third party (e.g., the third party recommendation service 262 of FIG. 2). In this manner, multiple media tiles may be available for the user presentation based on the user context, and to select which tiles and where to present them, the selection may be based on such criteria to provide content options to a user.

At block 418, the device may cause presentation, in response to the user request, of the generated user interface data using the first streaming media application. In particular, the device may provide the selected user interface data and the location of the data to present in respective rows and titles to the first streaming media application for presentation.

The descriptions herein are not meant to be limiting.

Figure 5:
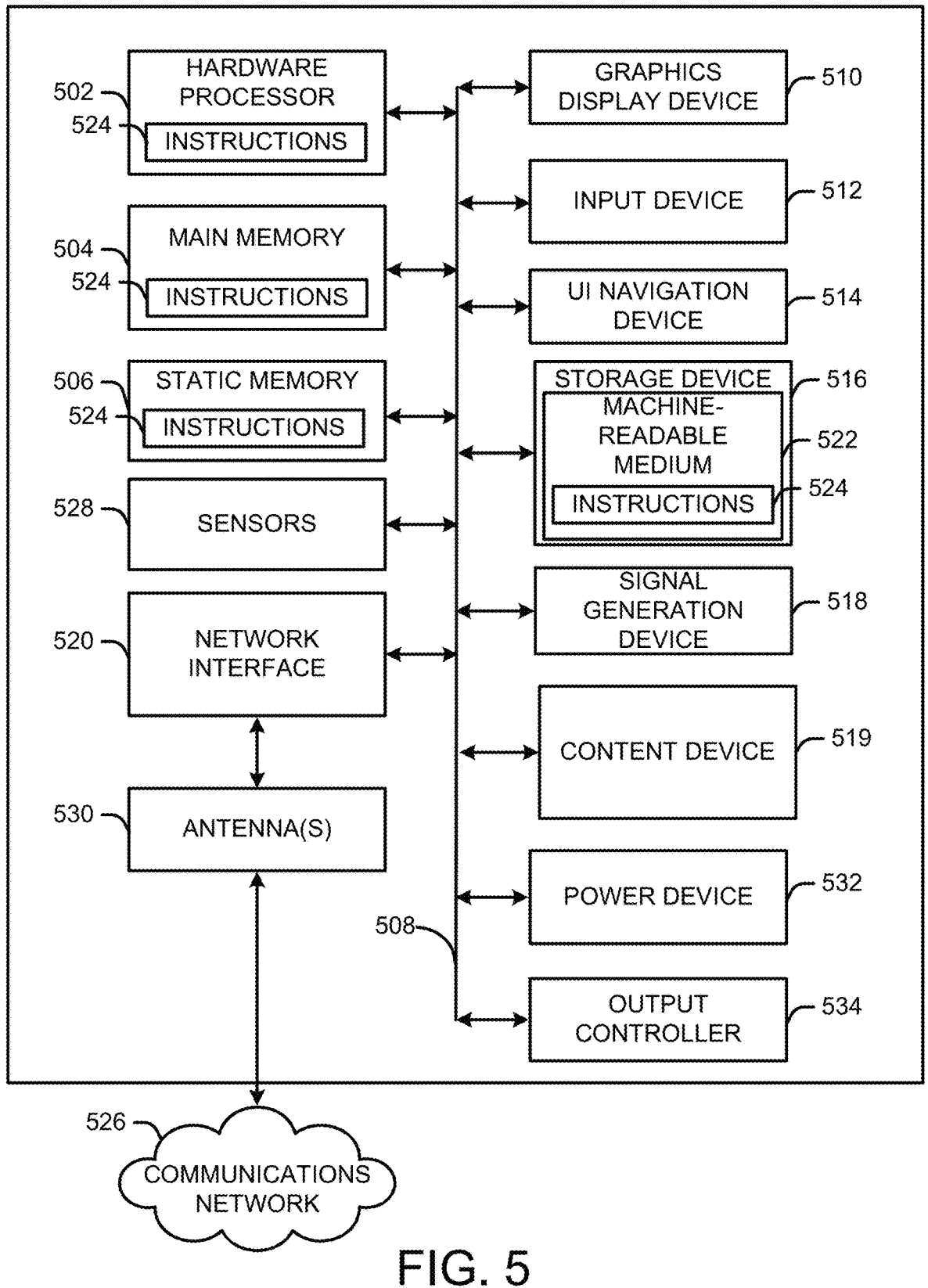
FIG. 5 illustrates a block diagram of an example machine upon which any of one or more techniques (e.g., methods) may be performed, in accordance with one or more example embodiments of the present disclosure.

FIG. 5 illustrates a block diagram of an example of a machine 500 (e.g., system 100 of FIG. 1 and/or the system 200 of FIG. 2) or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in Wi-Fi direct, peer-to-peer (P2P), cellular, (or other distributed) network environments. The machine 500 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532 (e.g., a battery or other power source), a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518, content device 519 (e.g., capable of performing any of the functions described in FIGS. 1-4), a network interface device/transceiver 520 coupled to antenna(s) 530, and one or more sensors 528, such as a microphone, a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method, comprising:
receiving, by at least one processor of a first device, from a first over-the-top (OTT) streaming media application of a second device, an indication of a user request received by the first OTT streaming media application to search for media titles having a content genre;
identifying, by the at least one processor, from a catalog of media titles available for presentation and OTT streaming media applications available for user selection, the media titles having the content genre;
identifying, by the at least one processor, based on the user request, an advertisement campaign for a second OTT streaming media application selectable to a user via the first OTT streaming media application, wherein the content genre, a presentation time, and a presentation location are absent from the advertisement campaign, wherein the presentation location is an application where the advertisement campaign for the second OTT streaming media application is to be presented;

selecting, by the at least one processor, based on identifying the advertisement campaign for the second OTT streaming media application based on the user request, by searching for the content genre from among the second OTT streaming media application, a first media title of the media titles;

selecting, by the at least one processor, based on searching for the content genre from among the second OTT streaming media application, a second media title of the media titles, the second media title available for presentation using the first OTT streaming media application, wherein the user is a subscriber to the first OTT streaming media application and is not a subscriber to the second OTT streaming media application;

generating, by the at least one processor, first user interface data indicative of the first media title;

generating, by the at least one processor, second user interface data indicative of the second media title; and causing presentation, by the at least one processor, based on the user request, of the first user interface data and the second user interface data using a user interface of the first OTT streaming media application.

2. The method of claim 1, further comprising:

identifying, based on the content genre, a third OTT streaming media application from the catalog;

generating third user interface data indicative of the third OTT streaming media application; and causing presentation, based on the user request, of the third user interface data using the user interface of the first OTT streaming media application.

3. The method of claim 1, further comprising:

identifying a second advertisement campaign associated with a third OTT streaming media application selectable to a user via the first OTT streaming media application, wherein the presentation time and the presentation location are absent from the second advertisement campaign;

selecting, based on the second advertisement campaign and the content genre, a third media title of the media titles, wherein the third media title is absent from the second advertisement campaign and is available for presentation using the third OTT streaming media application;

generating third user interface data indicative of the third media title; and causing presentation, based on the user request, of the third user interface data using the user interface of the first OTT streaming media application.

4. The method of claim 1, further comprising:

sending a request for a row of media titles, the request comprising an indication of the content genre; and receiving the row of media titles having the content genre, wherein identifying the media titles having the content genre is further based on the row of media titles.

5. A method, comprising:

receiving, by at least one processor of a first device, from a second device, an indication of a user request received by a first streaming media application of the second device to search for media titles based on user context data received by the first streaming media application;

identifying, by the at least one processor, from a catalog of media titles available for presentation and streaming media applications available for user selection, the media titles based on the user context data;

identifying, by the at least one processor, based on the user request, an advertisement campaign for a second streaming media application selectable to a user via the first streaming media application, wherein a presentation time and a presentation location are absent from the advertisement campaign, wherein the presentation location is an application where the advertisement campaign for the second streaming media application is to be presented;

selecting, by the at least one processor, based on identifying the advertisement campaign for the second streaming media application based on the user request, by searching for the user context data from among the second streaming media application, a first media title of the media titles;

selecting, by the at least one processor, based on searching for the user context data from among the second streaming media application, a second media title of the media titles;

generating, by the at least one processor, first user interface data indicative of the first media title;

generating, by the at least one processor, second user interface data indicative of the second media title; and causing presentation, by the at least one processor, based on the user request, of the first user interface data and the second user interface data using a user interface of the first streaming media application.

6. The method of claim 5, wherein receiving the indication comprises receiving, from the second device, the user context data, an indication of a user from whom the user request was received, and an indication that the first streaming media application received the user request, and wherein identifying the media titles is further based on receiving the user context data, the indication of the user, and the indication that the first streaming media application received the user request.

7. The method of claim 5, wherein the user is a subscriber to the first streaming media application and is not a subscriber to the second streaming media application.

8. The method of claim 5, further comprising:

identifying, based on the user context data, a third streaming media application from the catalog;

generating third user interface data indicative of the third streaming media application; and causing presentation, based on the user request, of the third user interface data using the user interface of the first streaming media application.

9. The method of claim 5, further comprising:

determining an attribution of the selection of the first media title to the advertisement campaign.

10. The method of claim 5, further comprising:

identifying a second advertisement campaign associated with a third streaming media application selectable to a user via the first streaming media application, wherein the presentation time and the presentation location are absent from the second advertisement campaign;

selecting, based on the second advertisement campaign and the user context data, a third media title of the media titles, wherein the third media title is absent from the second advertisement campaign and is available for presentation using the third streaming media application;

generating third user interface data indicative of the third media title; and causing presentation, based on the user request, of the third user interface data using the user interface of the first streaming media application.

11. The method of claim 5, further comprising:
sending a request for a row of media titles, the request comprising the user context data; and
receiving the row of media titles based on the user context data,
wherein identifying the media titles based on the user context data is further based on the row of media titles.

12. The method of claim 5, further comprising:
determining that the first media title is available for presentation using a third streaming media application selectable to a user via the first streaming media application; and
selecting the second streaming media application for the first user interface data based on the advertisement campaign.

13. The method of claim 5, wherein the user context data comprise a content genre, and wherein identifying the media titles based on the user context data comprises identifying the media titles based on the media titles having the content genre.

14. The method of claim 5, wherein the user context data comprise a media title search input, and wherein identifying the media titles based on the user context data comprises identifying the media titles based on the media titles having at least a word of the media title search input.

15. The method of claim 5, wherein the user context data comprise a name of an actor or an actress appearing in the media titles, and wherein identifying the media titles based on the user context data comprises identifying the media titles based on the actor or the actress appearing in the media titles.

16. The method of claim 5, further comprising:
determining that a first click-through rate of the first media title is greater than a second click-through rate of a third media title of the media titles,
wherein selecting the first media title is further based on the first click-through rate being greater than the second click-through rate.

17. The method of claim 5, further comprising:
identifying a recommended media title received from a third-party recommendation service,
wherein selecting the first media title is further based on the recommended media title.

18. A system comprising:
at least one processor; and
a memory storing computer-executable instructions, that when executed by the at least one processor, cause the at least one processor to:
receive, from a device, an indication of a user request received by a first streaming media application of the device to search for media titles based on user context data received by the first streaming media application;
identify, from a catalog of media titles available for presentation and streaming media applications available for user selection, the media titles based on the user context data;
identify, based on the user request, an advertisement campaign for a second streaming media application selectable to a user via the first streaming media application, wherein a presentation time and a presentation location are absent from the advertisement campaign, wherein the presentation location is an application where the advertisement campaign for the second streaming media application is to be presented;
select, based on identifying the advertisement campaign for the second streaming media application based on the user request, by searching for the user context data from among the second streaming media application, a first media title of the media titles;
select, based on searching for the user context data from among the second streaming media application, a second media title of the media titles, the second media title available for presentation using the first streaming media application;
generate first user interface data indicative of the first media title;
generate second user interface data indicative of the second media title; and
cause presentation, based on the user request, of the first user interface data and the second user interface data using a user interface of the first streaming media application.

19. The system of claim 18, wherein the at least one processor is further configured to:
identify, based on the user context data, a third streaming media application from the catalog;
generate third user interface data indicative of the third streaming media application; and
cause presentation, based on the user request, of the third user interface data using the user interface of the first streaming media application.

20. The system of claim 18, wherein the at least one processor is further configured to:
identify a second advertisement campaign associated with a third streaming media application selectable to a user via the first streaming media application, wherein the presentation time and the presentation location are absent from the second advertisement campaign;
select, based on the second advertisement campaign and the user context data, a third media title of the media titles, wherein the third media title is absent from the second advertisement campaign and is available for presentation using the third streaming media application;
generate third user interface data indicative of the third media title; and
cause presentation, based on the user request, of the third user interface data using the user interface of the first streaming media application.

* * * * *